Dec. 1, 1959 R. C. FERGUSON ET AL 2,915,110
JOINT-SEALING STRIP AND METHOD OF MANUFACTURE
Filed Sept. 5, 1956
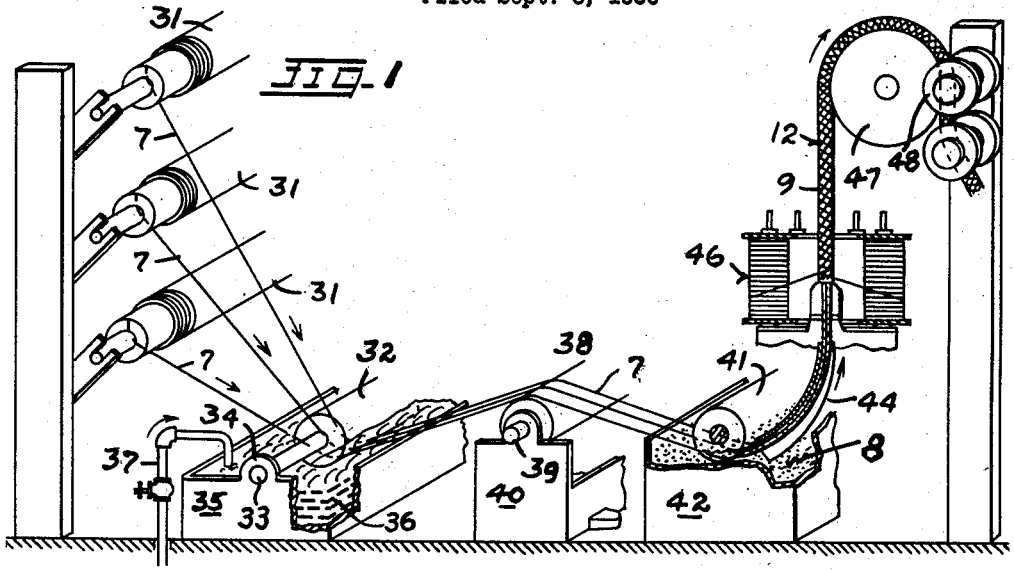
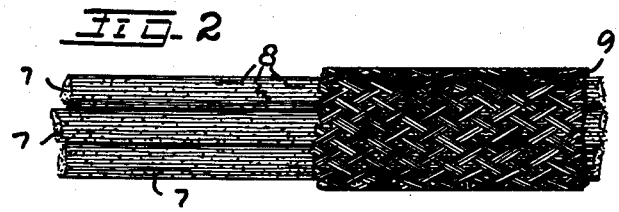
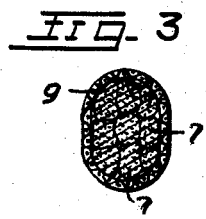
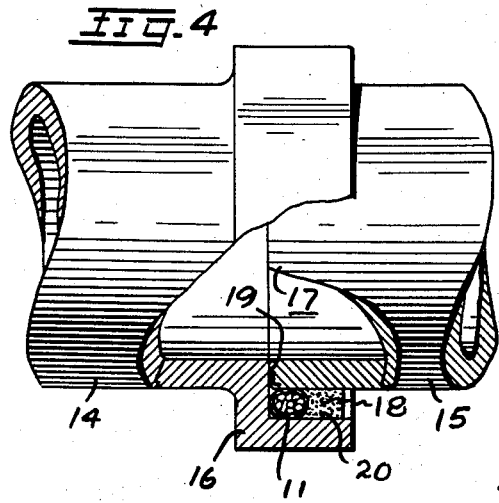
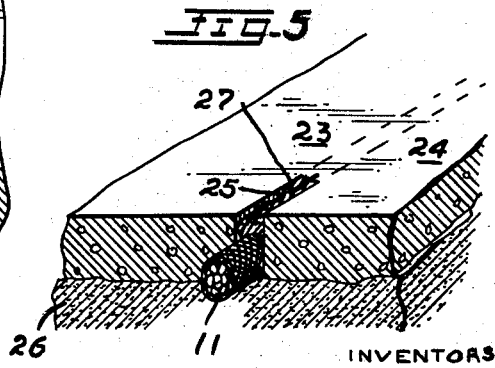
INVENTORS
R.C. FERGUSON, G.A. FERGUSON,
AND E.K. FERGUSON, Jr
BY Henry N. Young
ATTORNEY United States Patent Office 2,915,110
Patented Dec. 1, 1959

2,915,110

JOINT-SEALING STRIP AND METHOD OF MANUFACTURE

Reed C. Ferguson, Oakland, Gordon A. Ferguson, Bell, and Eli K. Ferguson, Jr., San Lorenzo, Calif.

Application September 5, 1956, Serial No. 608,160

5 Claims. (Cl. 154—33.1)

The invention relates to a particularly effective strip for sealing a joint against the passage of a liquid therethrough, and to the method and means for providing the strip, and this application comprises a continuation-in-part of our copending application Ser. No. 372,138, filed August 3, 1953, now abandoned.

A general object of the invention is to provide a sealing strip such that the applied strip will provide and maintain its seal primarily by reason of its wetting with the liquid to be restrained from passing through a joint at which the sealing strip is applied.

Another object is to utilize as the sealing material of a sealing strip a normally-dry inorganic material which expands and flocculates in place to a maximum degree when wet.

A further object is to provide a sealing strip of the character described which will maintain its seal under variable temperature and expansion conditions at a joint which is sealed therewith.

An added object is to provide an improved method and means of continuously producing the sealing strip of the character described.

A more specific object is to provide for the use of saponite, or the like, as the principal sealing material of the sealing strip.

Yet another object is to provide a sealing strip of the character described which is not subject to mildew or mold deterioration before and after its application.

A still further object is to provide the sealing material of a present sealing strip with a material which is poisonous to roots, whereby to inhibit the entrance of roots at openings which are closed by the sealing composition.

The invention possesses other objects and features of advantage, some of which, with the foregoing, will be set forth or be apparent in the following description of a typical embodiment thereof, and in the accompanying drawings, in which, Figure 1 is a somewhat diagrammatic view illustrating the apparatus and method of producing the sealing strip of our invention.

Figure 2 is a fragmentary side view of the sealing strip, portions of a sheath thereof being removed.

Figure 3 is a cross-section of a sealing strip shown in Figure 2.

Figure 4 illustrates the operative application of the present sealing strip to a bell joint of a pipe, a portion of the joint being broken away to show the joint and seal in section.

Figure 5 illustrates an application of the sealing strip to an expansion joint between coplanar elements of a structure.

The sealing or caulking strip of our invention essentially comprises a flexible core of uniform cross-section made up of strands 7 of fibrous material carrying a normally dry material 8 which expands and flocculates appreciably when wet, with the strands restrainedly enclosed in a porous sheath 9. A present caulking strip 11 of an appropriate length for a particular application thereof may be cut from a continuously manufactured yarn 12, a preferred method and apparatus for providing the yarn being diagrammatically illustrated in Figure 1. The expansive material 8 of the yarn 12 forms a fluid gel with the liquid wetting it, whereby a sealed condition of a joint utilizing the present sealing strip may be further assured whenever the strip is wet enough.

Figure 4 discloses a present sealing strip 11 applied as an annular ring for sealing a usual bell joint for connected pipe sections 14 and 15 in which a bell end 16 of the section 14 freely receives the spigot end 17 of the section 15 to define an annular space 18 between the cooperative bell and spigot ends of the sections and in which the sealing strip is mounted opposite the interior radial shoulder 19 of the bell end 16 of the pipe section 14. Figure 5 discloses the operative installation of a straight strip 11 in an expansion space 25 between spaced opposed edges of more or less coplanar slabs 23 and 24 comprising portions of a floor or pavement resting upon an earth or other foundation 26. The aforesaid disclosed applications of the present sealing strip are exemplary of a large number of possible applications thereof for a common purpose of sealing a joint in a structure against the passage therethrough of a liquid which contacts the sealing strip at one side or edge thereof.

As particularly indicated in Figure 1, strands 7 of fibrous threads extend from individual supply spools 31 beneath and against a horizontally mounted roller 32 at spaced adjacent points therealong. The roller 32 is supported on axial trunnions 33 which are journaled in and between bearings 34 provided at the ends of a trough 35 containing a wetting liquid 36 into which the lower portion of the roller 32 constantly extends. The liquid level in the trough 35 is preferably kept constant by renewing the liquid through a valved supply pipe 37 which may include a float valve (not shown) which is actuated by the level of liquid in the trough. The liquid 36 may comprise water alone or may include with water a special material for facilitating a wetting of the strands by the liquid, or having other ancillary functions.

The wet strands 7 are extended from the space of the trough 35 over a horizontal idler roller 38 which is engaged by the different strands at spaced points therealong, and is supported on trunnions 39 provided at the ends of a drip trough 40 which receives any wetting liquid 36 which is freed from the strands at the roller 38. The strands 7 pass downwardly from the top of the roller 38 and beneath a horizontal roller 41 disposed in a trough 42 which contains a suitably maintained supply of the sealing material 8 in a dry powdered form, the roller 41 being rotatably supported on the ends of the trough 42 in which a supply of the dry powdering material 8 is suitably maintained. The moistened strands are arranged to wet the engaged powdery sealing material just enough to effect its adhesion to the strands and effect some surface impregnation of the strands, the powdered strands then being substantially dry whereby the dampened powdery material 8 adherent to the strands is not wet enough to appreciably expand in accordance with its nature.

The individually powdered portions of the strands 7 are now passed upwardly through a collection guide 44 which draws the strands closely together into an assembly of circular cross-section for their passage from the guide and through a suitable conventional tube-braiding unit 46 which progressively forms the tubular sheath 9 about the strand assembly. The completed yarn 12 then passes between rollers 47 and 48 which grippingly engage it for advancing the assembly, it being understood that the strands comprise fibres which are matted to give the required tensile strength of the strands, both singly and collectively. The present yarn is usually applied as a flattened strip, and for this reason, the rollers 47 and 48 may flatten the completed yarn as well as advancing its strands from the supply spools 31 through the wetting and powdering and sheathing stations of the disclosed production apparatus.

It will now be noted that a present sealing strip 11 is usable in lieu of present seals of such organic fibrous materials as oakum, hemp, jute and cotton which are frequently applied alone or in mixtures including them for providing a seal thereat primarily by reason of their tamping in place and their swelling when wet, whereby the seal provided thereat is usually not assuredly complete, particularly under pressure conditions. In contra-distinction, the present sealing strip does not rely on the expansion of a wet fibrous core material for effecting a seal, but relies, rather, on the expansion of the fibre-carried material 8 which expands appreciably when wet while forming a sealing gel by flocculation in a confined jointure space by reason of its wetting in place, said gel flowing into maximum sealing position with respect to the core voids and faces of the structure space at the seal under any pressure against it at its joint.

In view of the aforesaid desired sealing qualities of the material 8, it has been found that, among available materials known to us, the mineral saponite, a silicate of aluminum and magnesium, has a particularly high degree of both swelling and gel-forming actions when hydrated, yet is not truly soluble in water. It has been further found that the formation of a sealing gel of saponite is appreciably facilitated and increased when it is combined with a flocculating agent such as sodium aluminate, aluminum sulfate, ferric sulfate, or other forms of trivalent salts; the sodium aluminate has proved to be the most satisfactory floocculating agent for use with saponite. While bentonite, a natural clay formation having similar expansive and floocculating qualities when wet might be used as the sealing material 8 in lieu of saponite, experience has shown that its effective sealing qualities are somewhat inferior to those of saponite when similarly used.

In view of the forgoing considerations, the material 8, with which the tape strands are coated to provide the present sealing yarn, preferably comprises a mixture of saponite and sodium aluminate in which the latter need constitute only up to about one percent of the mixture by weight. Since the expansive action and space-filling fluid gel of the wet saponite are primarily relied on as the sealing means of the present yarn, the fibres providing the strands 7 may not only be of such organic fibres as those of jute, hemp and cotton, but may also comprise inorganic fibres of such materials as asbestos and glass for utilizing the heat resistant or other physical qualities or chemical resistant qualities thereof, as needed. Owing to the constant fluidity of the sealing gel provided by the wet saponite, it will be understood that mutually spaced element parts providing a joint space between them may have opposed faces variably spaced under variable temperature conditions and so provide a more or less flexible expansion joint sealed by the saponite gel which constantly fills and connects all core and sheath voids between the said opposed faces of the joined elements.

By particular reference to Figure 4, it will be noted that the applied sealing strip 11 is more or less held in position in the annular space 18 between the bell and spigot ends of the joined pipe sections 15 and 16 by means of a retainer ring 20 which may be of lead or tar or asphalt or cement, or other suitable material. Particularly if the sealed pipeline carries a liquid which does not constantly fill its cross-section, as sewage, and therefore exerts little escape pressure, a present sealing means may be utilized to prevent the flow of ground water into the pipe through its sealed joints, whereby the pressure of the ground water is prevented from forcing such water into the pipeline. In either case, it will be understood that axial pressure against the installed sealing ring tends to force the sealing gel thereof toward the zone of least pressure whereby to provide and insure the required seal by the ring, it being understood that the annular space occupied by a sealing strip need not be of true uniform cross-section therealong as in the case of angularly related pipe sections. The pipes providing a joint to be sealed may be of clay or concrete or metal.

Understanding that yarns usable as a core for a present sealing strip, and particularly those comprising organic fibres in whole or in part, are subject to deteriorative and destructive rotting through the action of various septic micro-organisms such as mildews or molds, it has been found particularly advantageous to impregnate all porous organic fibres of the yarn 12 of the strip 11 with a water-soluble material which has a high degree of toxicity for such organisms, it being noted that the specific insoluble sealing composition and any inorganic fibres of the strip are aseptic. The rot-proofing material may advantageously be applied with the water used in the strip manufacture to provide for a retention of the applied materials in the strip when the product is prepared for its sealed packaging and storage and commercial distribution to have a desirable approximate ten percent moisture content by weight, such a moisture content approximately the hygroscopic value for the porous fibres used. Experiments have shown that solubilized sodium pentachlorophenol is a particularly effective agent for the present rot-proofing purpose, and is most effectively applied to the strip in solution in the water used in the strip manufacture in amounts ranging from 5 to 20 pounds dry weight per 2000 pounds of the prepared strip. Not only does such a rot-proofing composition function to prevent strip deterioration before the prepared sealing strip is installed, but it continues to function in the fibres of an operatively applied strip until leached therefrom. In reference to the use of the foregoing, or another rot-proofing composition with the fibres of a strip, it will be noted that the same may penetrate and impregnate such inorganic fibre formations as asbestos, and is fully distributed within the strip as at least a surface coating for any glass or other water-impervious fibres of the strip.

Understanding that many underground installations of pipelines having joints to be sealed are in ground containing, or liable to contain, live plant roots, it is obviously highly desirable that the entry of such roots through the joints be prevented, particularly by reason of the facts that the passage of a pipeline should not be clogged by roots and that any penetration of a root into the pipe may provide a leakage point, or may even crack the pipe by reason of the natural tendency of a growing root to expand. Accordingly, it is highly desirable to prevent a penetration of roots through pipe and other joints by supplying and applying a suitable root-inhibiting composition with the sealing medium 8 provided by a present sealing strip. The preferred such root-inhibiting material would comprise a chemical composition which is universally poisonous to all plant life, has a low water-solubility constant for prolonged effectiveness, and yet is sufficiently soluble for its availability to roots contacting it to prevent the growth of root portions adjacent a pipe point and receiving it, whereby to prevent the penetration of roots into a pipe thereat, and the material used is preferably one which may be pre-mixed with the sealing material 8 provided with the strip. Tests have shown that a particularly effective chemical material having the desired qualities for the present purpose comprises the chemical composition identified as 3-(p-chlorophenyl)-1, 1-dimethylurea, and the used amount of this particular composition found to be most effective ranges from ½ to 4 ounces per 500 pounds of yarn, which amount is approximately 2 ounces per 300 pounds of the dry sealing material 8, it being understood that only such an amount of the chemical should normally be provided that the inhibition of root growth may not extend unduly beyond the sealed pipe.

By reference to Figure 5, in which a sealing strip 11 is shown as operatively applied in the space 25 between spaced opposed edges of ground-supported slabs 23 and 24, which would usually be of metal or concrete material, the strip 11 is utilized for preventing a flow of water through the sealed space in the manner hereinbefore disclosed. In this instance, a filling material 27 is shown as applied above the sealing strip 11 in the space 25, said material preferably being, as a whole, plastic to a degree which insures its continuous disposal in the space 25, as under variable heat expansion conditions. In this manner, the filling 27 may provide a flush finish with the coplanar top faces of the slabs 23 and 24, the entire arrangement comprising an expansion joint which is suitable to the range of temperature conditions to be expected at the slabs, which might comprise a pavement, as that of an airfield.

It will be understood that a present sealing strip 11 of a length to fit an annular space to be sealed will be self-sealing at the abutted ends of the strip by reason of the permitted travel of the plastic aqueous gel thereat, and that successive strips, or yarn pieces, placed end-to-end in an elongated space, will be similarly self-sealing at opposed and engaged strip ends. While we have generally referred to the sealing strip of our invention as comprising a fibrous core carrying and positioning an initially dry powdery sealing material which expands and forms a plastic gel when wet, we have found that such a sealing material may, under some conditions, be successfully installed alone as a sealing filler for cracks and other small openings. Furthermore, if a structural joint already sealed with the present sealing material is disturbed, as by an earth movement, the plastic gel of the sealing material will promptly flow to fill any voids created to automatically maintain the seal.

From the foregoing description taken in connection with the accompanying drawings, the advantages of the present sealing strip device will be readily understood by those skilled in the art to which the invention appertains. While we have herein described and shown the structure and provision and use of a preferred form of our invention, we desire to have it understood that the present disclosure is primarily illustrative and that such changes and developments may be made, when desired, as fall within the scope of the following claims.

We claim:

1. In a strip for packing a joint against the passage of an aqueous liquid therethrough, a core of water-insoluble fibrous material carrying a powdery dry mixture of saponite and a flocculating agent for the saponite, said agent being about one percent by weight of the total dry powdery mixture.

2. The method of providing a packing strip for sealing a joint against the passage of an aqueous liquid therethrough, which comprises independently wetting continuous and like fibrous strands with water, adherently coating the wet strands with a dry powdery hydrous metallic silicate, selected from a group consisting of saponite and bentonite, which expands when wet, drying the strands, combining the dry strands in a compact core, and enclosing the core in a liquid-pervious sheath of fibrous material.

3. In a strip for packing a joint against the passage of an aqueous liquid therethrough, a core of water-insoluble fibrous material carrying a powdery dry mixture of a hydrous metallic silicate, selected from a group consisting of saponite and bentonite, and a trivalent salt which comprises a flocculating agent for the silicate, said salt being about one percent by weight of the total dry powdery mixture.

4. In a strip for packing a joint against the passage of an aqueous liquid therethrough, a core of water-insoluble fibrous material carrying a powdery dry mixture of a hydrous metallic silicate, selected from a group consisting of saponite and bentonite, and a trivalent salt which comprises a flocculating agent for the silicate, said salt being about one percent by weight of the total dry powdery mixture, and a liquid-pervious sheath retainedly enclosing the core.

5. In a manufactured strip for packing a joint against the passage of an aqueous liquid therethrough, a dry core of water-insoluble fibrous material uniformly impregnated with a water-soluble rot-proofing chemical and adhesively carrying a powdery dry mixture selected from a group consisting of saponite and bentonite and arranged to provide a void-filling fluid gel in the joint when the strip has been packed in the joint and is thereafter wetted with water.

References Cited in the file of this patent

UNITED STATES PATENTS

| | | |
|---|---|---|
| 1,602,312 | Qurin | Oct. 5, 1926 |
| 1,968,734 | Best | July 31, 1934 |
| 2,107,467 | Buhler | Feb. 8, 1938 |
| 2,266,638 | Hauser | Dec. 16, 1941 |
| 2,395,157 | Work et al. | Feb. 19, 1946 |
| 2,548,646 | Bicknell | Apr. 10, 1951 |
| 2,550,560 | Herron | Apr. 24, 1951 |
| 2,637,661 | Benignus | May 5, 1953 |
| 2,705,195 | Cupery et al. | Mar. 29, 1955 |
| 2,709,648 | Ryker et al. | May 31, 1955 |

FOREIGN PATENTS

| | | |
|---|---|---|
| 482,527 | Canada | Apr. 15, 1952 |
| 514,421 | Great Britain | Nov. 7, 1939 |